US009280893B2

(12) United States Patent
Koch

(10) Patent No.: US 9,280,893 B2
(45) Date of Patent: Mar. 8, 2016

(54) COMMUNICATION SYSTEMS AND METHODS TO BROADCAST AUDIO OR CONTROL TO A REMOTELY LOCATED DEVICE

(71) Applicant: Richard N. Koch, Boston, MA (US)

(72) Inventor: Richard N. Koch, Boston, MA (US)

(73) Assignee: Richard N. Koch, Boston, MA (US)

( * ) Notice: Subject to any disclaimer, the term of this patent is extended or adjusted under 35 U.S.C. 154(b) by 59 days.

(21) Appl. No.: 14/168,706

(22) Filed: Jan. 30, 2014

(65) Prior Publication Data

US 2014/0211961 A1 Jul. 31, 2014

Related U.S. Application Data

(60) Provisional application No. 61/758,402, filed on Jan. 30, 2013, provisional application No. 61/908,422, filed on Nov. 25, 2013.

(51) Int. Cl.
*H04M 11/00* (2006.01)
*G08C 17/02* (2006.01)

(52) U.S. Cl.
CPC .................................... *G08C 17/02* (2013.01)

(58) Field of Classification Search
CPC .................... H04N 21/41415; H04N 21/4223; H04N 21/4227; H04N 21/4622; H04N 5/4403; H04N 7/142; E04H 13/003; E04H 13/001; E04H 13/008; E04H 3/00; A61G 17/00; H04L 12/2818; H04M 11/007; H04M 11/066; Y02B 20/42; G08C 17/02
USPC ............. 379/102.01, 102.02, 102.03, 102.07, 379/38; 348/14.01, 14.02, 14.04, 14.05, 348/14.07, 14.08
See application file for complete search history.

(56) References Cited

U.S. PATENT DOCUMENTS

| | | | | |
|---|---|---|---|---|
| 5,959,661 | A * | 9/1999 | Isono | 348/14.05 |
| 8,390,204 | B1 * | 3/2013 | Zagha | 315/153 |
| 2001/0036354 | A1 * | 11/2001 | Majors | 386/46 |
| 2004/0085337 | A1 * | 5/2004 | Barrows | 345/717 |
| 2008/0141508 | A1 * | 6/2008 | Silva | 27/1 |
| 2010/0284526 | A1 * | 11/2010 | Dempsey | 379/102.07 |
| 2010/0307037 | A1 * | 12/2010 | Chi | 40/124.5 |
| 2012/0150675 | A1 * | 6/2012 | Lederer | 705/26.1 |
| 2013/0235218 | A1 * | 9/2013 | Cathcart et al. | 348/207.1 |
| 2013/0332563 | A1 * | 12/2013 | Yuen | 709/217 |
| 2014/0118468 | A1 * | 5/2014 | Purdy et al. | 348/14.08 |

* cited by examiner

*Primary Examiner* — Stella L Woo
(74) *Attorney, Agent, or Firm* — Chapin IP Law, LLC

(57) ABSTRACT

This disclosure enables a respective user to show support to a person of interest. One configuration includes a network (e.g., phone network, Internet, etc.) configured to receive input from a respective user (e.g., family member, friend, etc.) and control a remotely located device. The remote device can be located at any suitable locations such as a gravesite of a deceased party, a hospital room in which a disabled patient resides, etc. Via input from a respective user, the respective user can control different functions of a remote target device such as audibly communicate one or more messages in a vicinity of the gravesite, control a remote device such as light source (such as a candle, light emitting diode, etc.), etc.

30 Claims, 3 Drawing Sheets

COMMUNICATION SYSTEMS AND METHODS TO BROADCAST AUDIO OR CONTROL TO A REMOTELY LOCATED DEVICE

RELATED APPLICATIONS

This application is related to and claims the benefit of earlier filed U.S. Provisional Patent Application Ser. No. 61/758,402 entitled "COMMUNICATION SYSTEMS AND METHODS TO BROADCAST AUDIO OR CONTROL TO A REMOTELY LOCATED DEVICE,", filed on Jan. 30, 2013, the entire teachings of which are incorporated herein by this reference.

This application is related to and claims the benefit of earlier filed U.S. Provisional Patent Application Ser. No. 61/908,422 entitled "COMMUNICATION SYSTEMS AND METHODS TO BROADCAST AUDIO OR CONTROL TO A REMOTELY LOCATED DEVICE,", filed on Nov. 25, 2013, the entire teachings of which are incorporated herein by this reference.

BACKGROUND

It is often difficult to lose a close friend or relative as a result of death. As a culture, we typically mourn such an occasion by attending a funeral, visiting a gravesite of the deceased, sending flowers, etc.

BRIEF DESCRIPTION OF PREFERRED EMBODIMENTS

It is sometimes impossible or impractical for every family member or friend of a deceased party to attend a respective funeral or visit a gravesite of a deceased party. For example, family members or friends of the deceased party may be located too far away to attend the deceased person's funeral; family members or friends of the deceased party may be physically handicapped preventing them from attending the deceased person's funeral; and so on.

Additionally, it may be difficult for persons to visit the gravesite the deceased party due to geographical constraints. For example, a surviving member of a family may be located hundreds or thousands of miles away from a respective gravesite, thus, preventing the surviving member from visiting the gravesite.

Embodiments herein include a way for a respective user to show support to a person of interest. The person of interest can be a deceased person (and/or the deceased person's relations) or a living person such as a comatose patient (in a health such as a hospital, long term care, nursing home, etc.) remotely located with respect to a user. For example, one embodiment herein includes a network (e.g., phone network, Internet, etc.) configured to receive input from a respective user (e.g., family member, friend, etc.) and control a remotely located device. The remote device can be located at any suitable locations such as a gravesite of a deceased party, a hospital room in which a disabled patient resides, etc.

Via input from a respective user, the respective user can control different functions of a remote target device such as audibly communicate one or more messages in a vicinity of the gravesite, control a remote device such as light source (such as a candle, light emitting diode, etc.), etc.

In accordance with further embodiments, the methods and apparatuses as discussed herein enable a user to place a call either by directly dialing a specific predetermined number on a communication device or click on a desired person's name (such as a deceased person) in a web page displayed on a respective display screen.

Based on a selected name, a called number, a called deceased person, a called place of the deceased person, etc., to which a call is directed, a processor resource identifies a remote target device associated with the selection. The processor resource maps the selection (i.e., selection of a person of interest) to a unique identifier associated with the remote target device assigned to the person of interest. The unique identifier may be a phone number, a network address, an RFID tag, etc. Using the unique identifier, the processor resource routes the incoming call to the specific remote target device, which is located in a vicinity of the deceased party or disabled patient.

In one embodiment, there is no need for any person to be on the receiving end of the call at the remote target device located in a vicinity of the called party (i.e., deceased party, disabled party, etc.). For example, the remote device receives an incoming call from a caller and accepts the call to establish a call connection. Via the call connection, the calling party is then able to broadcast their voice in the vicinity of the remote target device. As previously discussed, the remote target device can be located at any suitable locations such as the gravesite, at a bedside of a disabled patient, etc.

More specifically, upon acceptance of the call by the remote target device, the remote target device sets itself into a speaker mode. The user making the call talks into their phone or any suitable microphone at the user's end. Via the network connection between the calling party and the remote target device, the remote device receives an audio signal (e.g., data packets, analog signal, digital signal, etc.) of a person speaking into a respective device (e.g., computer, phone, etc.) from which the call request is made. A network (e.g., cellular network, public switched telephone network, one or more WiFi™ networks, etc., or any combination thereof) conveys the audio signal over a network to a specific remotely located target device. The remote target device converts the audio signal received over the network (or combination of multiple networks) into a respective audio output that is audibly played back on a speaker at the remote target device.

In one embodiment, as mentioned, the remote target device can be located at gravesite of the deceased person. Via routing of the incoming call to the appropriate gravesite, the caller is able to audibly project their voice in a vicinity of the gravesite near which the remote target device (i.e., communication device) is located. As discussed below, a caller can perform different functions as well.

Thus, one embodiment herein includes an apparatus that is RF enabled (such as Wi-Fi enabled, cellular enabled, etc.) to receive a call and is automatically placed in speaker mode. The caller can then talk or send any other recorded voice communication to the apparatus. The remote device receiving the audio signal physically broadcasts the caller's voice to the surrounding area at one or more appropriate pre-determined decibel levels, thus enabling the caller to be anywhere in the world and have their voice played back at a specific location where a party of interest is located. In other words, calls that are to a particular number are intended to be played back in a loudspeaker mode.

In this manner, a caller can remotely "visit" a gravesite, say what they want or transmit any audio (such as a granddaughter violin recital) and then just hang up the respective phone device from which the call is made.

In accordance with further embodiments, the user can visit a website to communicate with a remote target device to show support for the deceased or disabled party. The user can access a deceased person's account to view options of performing different available functionality. For example, via display of texts and selectable symbols, the website can indicate different options such as: i) selection of prayers that will be displayed on a screen and can be read to the deceased person at the gravesite, ii) a selection of songs and hymns that can be sung "Karaoke" style by the user making the call, iii) selection of turning ON a candle or light near the deceased party's gravesite, etc.

Embodiments herein can include a web service that sends reminders to living persons associated with the deceased party via email or other social media such as Twitter™, Facebook™, etc. These reminders can indicate dates such as the birthday or anniversary of the deceased party. The living persons can then call the deceased party or perform other functions such as light a vigil candle, playback the deceased party's favorite music, etc.

In certain instances, it may be desirable to notify persons associated with the deceased party when someone performs a respective function. Notification to others can include generating one or more messages indicating that someone utilized the service to show support for the deceased party. For example, in one embodiment, the message(s) can indicate that a user John Smith initiated audible playback of a prayer at the deceased party's (Joe Smith's) gravesite via communications to an appropriate remote target device. In accordance with another embodiment, the message can provide notification that a respective user Jane Doe initiated lighting of an LED candle at a deceased party's (Grandma Jones') gravesite to show support. Any functions are possible.

Accordingly, the persons associated with the deceased party can be notified of different actions taken by members of a group supporting the deceased party.

Further embodiments herein include a web site designed to house specific information in a database, with appropriate front-end capabilities for input and reporting. The information can include a specific telephone number assigned to an account. Another identifies that account to include such information as a person's specific name, location, date or place of death. The account also can be configured to keep track of the serial number of the corresponding apparatus and the IP address of that specific apparatus, as well as accounting and billing information.

Yet further embodiments herein include a telephone switch with redirection capabilities to "set up" a call with routing either through the Internet, cellular, radio frequency, etc. The switch can identify the incoming phone number or the designated application choice from a computer or smart phone. The switch then redirects the voice call to a specific IP address using a specific Internet protocol such as 802.11, or sends the call to a specific cellular MTSO or radio platform for completion. Upon the call being successfully set up the caller is prompted by the switch with a message indicating that conversation (e.g., speaking a message to be palyed back a the deceased party's gravesite) can start. A beep tone can be sent to the originating caller periodically to indicate the call is still active and that the calling party's voice is being palyed back a the gravesite of the deceased party.

In accordance with yet further embodiments, the database can be updated to record calling data such as originating ANI and call time and duration.

If there is a call in progress when another call comes in for the same account the originating caller is prompted to call back at a later time. All prompts can be in multiple designated languages. Prompts and beeps can also be sent silently to an originating computer or smart phone via a graphic user interface.

The Wi-Fi scenario the system is reliant upon a Wi-Fi signal being able to locate and initiate a calling session with the specific apparatus. In the case of cemeteries a Wi-Fi network would be established to reach any placed apparatus within the surrounding graves.

The apparatus as discussed can be placed at a specific location such as a grave site for example. The apparatus can include a sturdy housing of approximately two inches in diameter and approximately twelve inches in length. One end is a point with a spiral thread running upward from the point approximately eight inches. This structure enables the device to be "screwed" into the ground.

The top end of the housing is fitted with a thread enabling the inside components to be securely screwed inside the housing. The thread mechanism has a rubber or silicon gasket making the unit weather and waterproof. Protruding from the top of the housing is a solar panel array of solar cells generating an electric current back into the housing. Also from the top is a Wi-Fi antenna approximately two inches in length enabling the inside components to accept Wi-Fi signals.

In one embodiment, inside the housing are three major components. The first is a battery pack consisting of multiple re-charge batteries specifically designed to be charged by solar cells. The batteries power the second component—a commercially available and individually addressable Wi-Fi receiver circuit board. The board is always on and responds positively back to the switching apparatus when its internal unique IP address is invoked. The board then is prompted to initiate a call set up and begins a sound generating session. The third component in the housing is a weather proof speaker that is capable of generating sound so that the decibel level as heard from the outside of the housing will be approximately 40 decibels.

In accordance with further embodiments, the housing protrudes approximately six inches from the ground and is made of material that will not be damaged by grass trimming equipment. The color of the housing can vary depending upon any specific rules at the placement site.

The housing need not be placed in the ground to work; it can be placed and secured anywhere it is able to receive enough light to produce an electric current in the solar cells sufficient to keep the batteries charged and receive a wireless signal.

Embodiments herein can include operation of a respective device where there is no Wi-Fi signal. The replacement of the circuit board containing the Wi-Fi receiver with a cellular or radio receiver able to accommodate and respond to an available cellular or radio signal will also work. In that case the switching gear will not utilize an IP interface for the outbound leg of the call but will send a call request to a cellular MTSO a radio spectrum broadcast interface to be able to initiate a one way voice call.

Additional Embodiments

Hardware functionality—An electronic candle mounted on the top of the housing can be remotely turned on via the web site or speaking appropriate commands into the calling party's device. The caller can also designate the length of time the candle is lit and specific times in the future to turn the candle ON and OFF. In one embodiment, the caller can check status information on the web site to determine if the candle is ON or OFF as another person may have turned it on. The accessible web page can indicate the party that initiates the control of the light source.

The remote target device at the gravesite can include one or more video cameras to obtain images of the gravesite. The video cameras enable the party accessing the web site to view the surrounding area of the gravesite at which the remote target device is installed. A specific user can activate or designate the video to be open to the public if desired. In further embodiments, the user can provide control input to control the particular area of the gravesite that is viewed by the one or more video cameras.

A video screen is an option for the top of the housing, enabling people to stream either live or recorded video's to the grave site.

The housing can be optionally made into two parts—the bottom part containing the three components—battery, circuit board and speaker. The top part with the solar array and antenna can be placed separately via a cable in another location. This allows for placement in a mausoleum where remains are stored indoors without that availability of sunlight to charge the batteries. This method also allows use in a columbarium where urns are stored in a niche.

These and other embodiments will be discussed in more detail below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FURTHER SUMMARY AND DETAILED DESCRIPTION OF EMBODIMENTS

Figure 1:
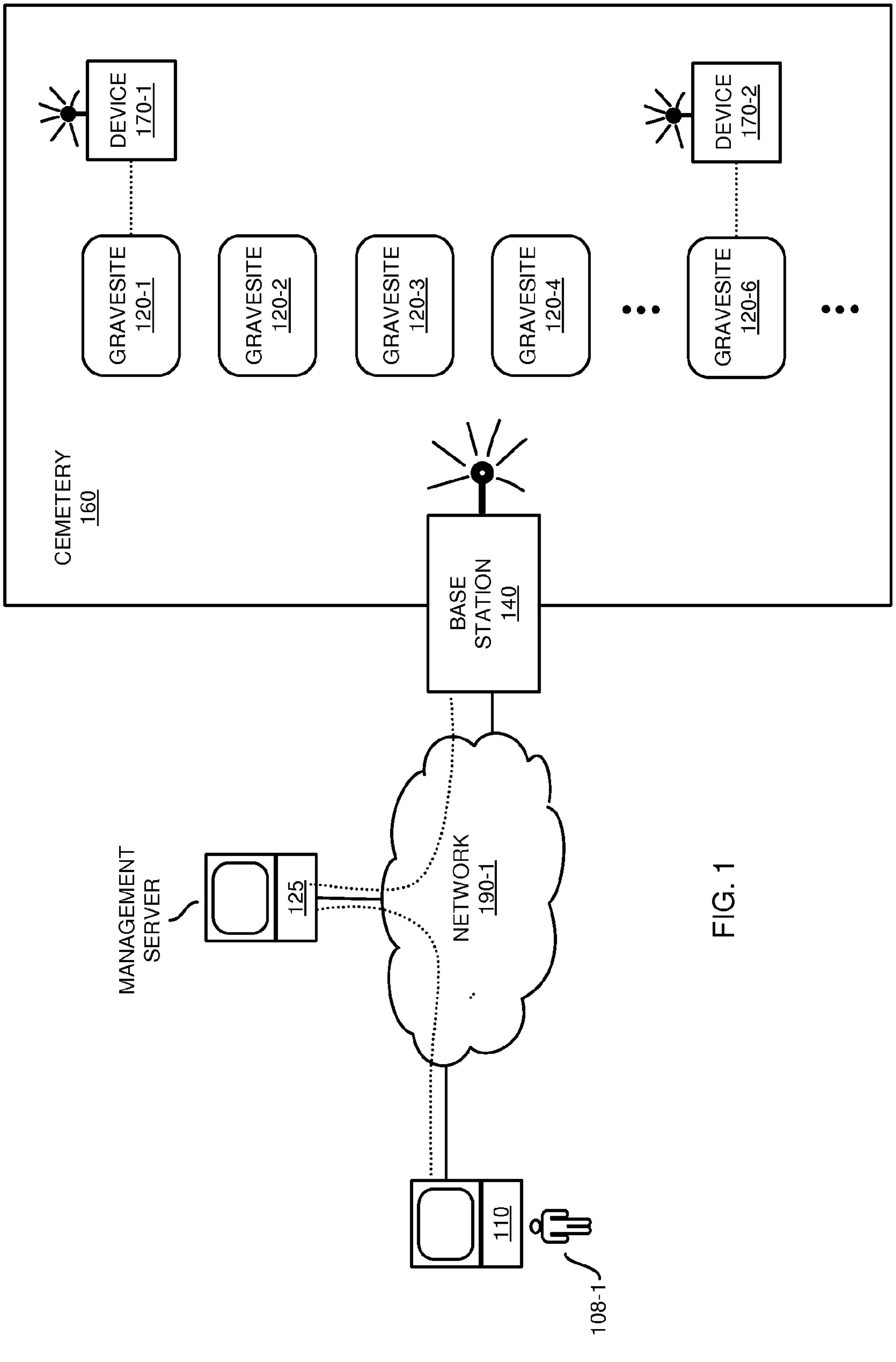
FIG. 1 is an example diagram of a network and corresponding components facilitating communications according to embodiments herein.

FIG. 1 is an example diagram illustrating control of a remote target device according to embodiments herein.

Embodiments herein can include cemetery 160. Cemetery 160 includes multiple gravesites 120-1, 120-2, 120-3, 120-4, 120-5, 120-6, etc. each gravesite can include headstone. One or more remote target devices 170 can be co-located with respect to a corresponding gravesite. In this example embodiment, remote target device 170-1 is co-located with respect to gravesite 120-1; remote target device 170-2 is co-located with gravesite 120-6. As described herein, the remote target devices 170 support different functionality such as playback of audio, switching a corresponding light between ON and OFF settings, etc.

Note that each of the remote target devices can be a standalone device adhered to the side of a respective gravestone. Further, a housing of the corresponding remote target device can be selected to match a corresponding color of a gravestone at the gravesite.

In accordance with yet further embodiments, a remote target device 170 can include a coating of adhesive material that enables one to stick the corresponding remote target device to a gravestone.

In yet further embodiments, a respective remote target device can be housed within an enclosure that looks like a rock, blending the remote target device into a surrounding landscape.

Yet further, a respective remote target device can include a protective housing such that the respective remote target device can be inserted into the ground. By way of non-limiting example, the surface of the respective remote target device can be flush with a corresponding surface of the ground to avoid damage by passersby, lawnmowers, etc.

As shown in this example embodiment, user 108 operates client device 110 (such as a computer device) to access the network 190-1 (Internet, public phone network, cellular phone network, etc.). Client device 110 can be any suitable type of computer such as a cellular phone, a personal computer, a landline phone, etc.

Management server 125 in network 190-1 enables each of one or more users to access web pages indicating names of potential parties of interest such as disabled patients in a hospital, deceased persons buried in a corresponding cemetery, etc.

Management server 125 can be configured to keep track of names of persons that have been assigned a corresponding remote target device. In certain instances, names of persons (deceased or alive) assigned a corresponding remote target device can be publicly available the access to the management server 125. That is, in one embodiment, any user can access management server 125 to view names of persons who have been assigned a corresponding remote target device to carry out different operations as discussed herein. Alternatively, one or more names of persons managed by management server 125 are only accessible if the corresponding user provides an appropriate unique identifier such as a password, phone number, source destination address, etc., to access the information.

In addition to managing names and corresponding locations of parties of interest, note that the management server 125 can be configured to include a mapping of each of the parties of interest to a corresponding location where the party of interest resides. For example, in one embodiment, the mapping maintained by management server 125 can indicate that a first deceased party such as James Smith is located at a first geographical location (such as gravesite 120-1); the mapping maintained by management server 125 can indicate that a second deceased party such as John Doe is located at a second graphical location (such as gravesite 120-6); the mapping maintained by management server 125 can indicate that a third deceased party such as Jane Doe is located at a third geographical location; and so on.

In one embodiment, a corresponding user can access management server 125 to perform a search for a person of interest to determine where the person of interest is located. For example, the user 108 can access management server 125 to determine the location of deceased party John Doe. As discussed below, assume that the party John Doe is assigned remote target device 170-1. Subsequent to performing a respective search, and determining that the party John Doe has been assigned remote target device 170-1, the user 108 is then able to communicate commands to the remote target device 170-1 to perform different operations such as playback prerecorded messages, control activation of a respective light, etc.

As discussed below, the management server 125 can be configured to provide user 108 a phone number to be used to call the remote target device 170-1. Use of the phone number can cause the corresponding client device 110 to connect with management server 125. Management server 125 facilitates conveyance of appropriate data from client device 110 to the corresponding remote target device 170-1.

Management server 125 can be configured to produce and manage a phone listing of deceased persons. The phone listing may be available to the public. Users can access the phone listing to identify the corresponding number to call to communicate with a corresponding deceased person. As mentioned above, in certain instances, a party can be removed from the phone listing.

In one embodiment, the management server 125 is configured to serve webpages over network 190-1 to the user 108 at client device 110. Via the webpages or other suitable graphical user interface, the user of client device 110 is able to view different control options and status information of a particular person of interest and control a respective remote target device (such as remote target device 170-1) located in the vicinity of the deceased party. Thus, via input to control device 110, the user 108 is able to control one or more different remote target devices 170 located in a vicinity of a respective gravesite.

As a more specific example, example, James Smith may be buried at gravesite 120-6 in cemetery 160 as shown. In response to receiving a request from user 108 at client device 110 to perform a respective control function with respect to the remote target device 170-2, the management server 125 initiates forwarding and transmission of the control or information signal to base station 140 (e.g., an RF device). The base station transmits the control or information signal as an appropriate RF signal to the remote target device 170-2 located in a vicinity of gravesite 120-6.

Communications transmitted over network 190-1 can vary depending on the embodiment. For example, in one embodiment, in response to receiving the command to execute a corresponding function as specified by user 108, the management server 125 uses a corresponding network address associated with remote target device 170-2 in order to forward an appropriate command to the remote target device 170-2 to initiate execution of a respective function. In one embodiment, the management server 125 provides client device 110 an appropriate network address of remote target device 170-2 such that the client device 110 can directly communicate over network 190-1 to the remote target device 170-2.

Base station 140 can be any suitable type of resource. For example, by way of non-limiting example, the base station 140 can be a Wi-Fi access point disposed in cemetery 160. In accordance with an alternative embodiment, the base station 140 can be a cellular telephone tower.

Each of the remote target devices 170 can be any suitable type of resource as well. For example, remote target devices 170 can be Wi-Fi enabled devices, cellular phone devices, etc.

As previously discussed, the control input from the user 108 can indicate to perform any suitable function. By way of a non-limiting example, the remote target device 170-2 can be equipped with a light source. The control input received from the client device 110 can indicate to activate the light source. In such an instance, the management server 125 receives notification from user operating client device 110 to activate the light source. As mentioned, this can include receiving one or more data packets transmitted by the client device 110 indicating to execute the corresponding activation command.

To activate the light source, the management server 125 communicates the control information to base station 140. This can include receiving one or more data packets (including the activation command) from the management server 125. As previously discussed, the client device 110 can communicate directly with remote target device 170-1.

Base station 140 further communicates the control input (i.e., activation command) initiated by user 108 to the remote target device 170-2. As mentioned, one embodiment herein includes identifying a network address associated with the remote target device 170-2. To deliver the control information, the management server 125 produces one or more data packets including the control information. The management server 125 establishes a communication session with remote target device 170-2. Thereafter, the management server forwards the one or more data packets including the control information or network 190-1 to base station 140. The station 140 wirelessly broadcasts the data packets including the control information in a vicinity of cemetery 160.

The remote target device 170-2 receives the control information and decodes the corresponding received control information. In accordance with the control information, the remote target device 170-2 activates a respective light source in a vicinity of the gravesite 120-6. Accordingly, via input by the user 108 to control device 110, the user 108 is able to control a selected remote target device from a remote location.

As discussed above, the user 108 can perform any of multiple different control functions via respective input to client device 110.

In accordance with another example embodiment, the user 108 operating client device 110 can communicate with management server 125 to initiate a function at a selected remote target device. For example, the user 108 may wish to play back an audible message in a vicinity of gravesite 120-1. Assume that the user 108 selects a party of interest located at gravesite 120-1. The user 108 operates computer device 110 to input an audio signal such as a voice signal. The client device 110 forwards the audio signal as data packets over network 190-1 to management server 125. The management server 125, in turn, forwards the data packets including the audio signal to base station 140. The base station 140 receives the data packets and communicates them to the appropriate remote target device 170-1 in cemetery 160. Remote target device 170-1 initiates audible playback of the audio signal using a corresponding speaker. Accordingly, the voice input from user 108 is physically reproduced such that a person in a vicinity of gravesite 120-1 hears a rendition of the user's voice.

As a further example, the webpages served to the user 108 from management server 125 can include a listing of prayers, songs, eulogies, etc., that can be selected and viewed by the user 108 at client device 110. In response to receiving a selection such as a prayer, the management server 125 can be configured to initiate display of a corresponding webpage on client device 110 including the selected prayer. The user 108 is then able to read text on a corresponding display screen of client device 110. In a manner as discussed above, the client device 110 transmits a corresponding audio signal (i.e., the prayer being read by the user 108) as data packets to management server 125. Management server 125 forwards the data packets to a selected remote target device for audible playback.

In accordance with further embodiments, a user such as a subscriber who purchases the service and corresponding remote target device can select an audio file to be played at the corresponding remote target device when the user initiates a call. More specifically, a caller may want to have a certain prayer or song or some other recording played back at a selected remote target device when the call is first set up and connected. By way of non-limiting example, the management server 125 can be configured to provide feedback to the caller such that the caller is able to hear what is being played back at the remote target device.

In accordance with yet further embodiments, via a resource such as client device 110, a user 108 in communication with management server 125 (or directly in communication with the remote target device 170-1) can provide control information indicating different operations to execute at a corresponding remote target device at different scheduled times. For example, in one embodiment, the user 108 can select prerecorded content such as a song, prayer, etc., that is to be played back at a corresponding selected remote target device. Software disposed in suitable resource such as the management server 125 or the remote target device 170-1 can include a corresponding scheduler function. The scheduler function keeps track of current time and determines one or more scheduled operations (such as payback of prerecorded content, control of an LED light, etc.) to be performed at the selected remote target device based on the received control information indicating the corresponding operations that are to be executed. One or more persons at disparate locations in a corresponding network can provide the control information.

Any further example embodiment, the control information can indicate to perform an operation such as light a corresponding LED candle at the remote target device at 10 o'clock in the morning each Sunday. In such an instance, when scheduler function in the remote target device 170-1 detects that it is 10 o'clock in the morning and it happens to be a Sunday, the remote target device 170-1 initiates lighting of a corresponding LED candle at the remote target device 170-1. The scheduler function can further process the control information to identify how long the LED candle is to be lit. For example, control information can indicate that the LED candle is to be lit for one hour. In such an instance the scheduler function initiates shutting off the LED candle at the remote target device 170-1 at 11 o'clock on a corresponding Sunday morning.

As another example, the remote target device 170-1 can be configured to receive control information indicating that the remote target device 170-1 is to playback a corresponding selected prayer at 8 o'clock each night. In such an instance, when the scheduler function detects that it is 8 o'clock at night, the scheduler function initiates audible playback of the selected prayer in a vicinity of gravesite 120-1.

If further desired, the management server 125 can be configured to transmit a voice audio signal of the user to the remote target device for simultaneous playback of the voice audio signal and a corresponding prerecorded message at the remote target device.

Alternatively, a voice audio signal of the caller can be blocked while the prerecorded messages play back at the remote target device. After the prerecorded message has ended, the management server 125 can be configured to initiate playback of the voice audio signal of the caller.

As previously discussed, the management server 125 can be configured to store information such as a unique identifier value of the remote target device itself, which may be an IP address, phone number, etc. Additionally, the management server 125 can be configured to keep track of unique identifier values associated with possible users of the system. Each of multiple different persons using the system as described herein may wish to perform different functions with respect to the corresponding remote target device assigned to a person of interest via a corresponding assigned remote target device. The management server 125 can be configured to perform different operations depending upon which of multiple possible users is calling a target device.

One way to detect an identity of the user that is making a respective call is to identify a network address associated with the originating computer device. Another way to detect an identity of the user that is making a respective call is to recognize a corresponding user's calling caller ID information such as a number through ANI (Automatic Number Identification). Yet another way to detect an identity of the user that is making respective call is to challenge the corresponding user to provide an appropriate password enabling the user to use corresponding functionality provided by management server 125.

Depending on the configuration assigned to a corresponding identified user, the management server 125 operates in a manner as assigned to the identified user.

Alternatively, a subscriber can configure the management server 125 such that all persons who call the management server 125 to execute a predetermined function (such as audio playback of prayer at the remote target device, turn on a respective light for a duration of time, and so on), with respect to a particular remote target device operate in a similar manner, as opposed to being customized on a per user basis as previously discussed.

In yet further embodiments, the management server 125 can be configured to store a list of numbers of corresponding users that are to be blocked with respect to controlling a remote target device. For example, the management server 125 can be configured to identify that a caller has a corresponding unique identifier value that is present in the block list. Since the caller has been identified as being present in the block list, the management server 125 prevents the caller from controlling the remote target device.

Playback of an audio signal at a selected remote target device can be performed in substantially real-time. For example, user 108 can speak into a microphone located at client device 110. In a manner as previously discussed, the audio input received at the microphone is conveyed over network 190-1 to the appropriate selected remote target device. Depending on a delivery rate (which may vary due to congestion) of data packets through network 190-1, the remote target device plays back a delayed rendition of the audio signal detected by the microphone at client device 110. Typically, the delay is less than one second.

It may be desirable to provide audible or visual feedback to the corresponding user 108 that a rendition of their voice was or is being played back by a corresponding selected remote target device. By way of non-limiting example, assume that remote target device 170-1 was selected by the user 108 to playback a corresponding audio signal such as a prerecorded audio signal or an audio signal inputted into a microphone located at client device 110-1. In a manner as previously discussed, the remote target device 170-1 receives the audio signal in a stream of data packets conveyed through base station 140. In response to receiving the stream of data packets, the remote target device 170-1 transmits one or more acknowledgment messages to base station 140. Accordingly, via one or more acknowledgment messages, base station 140 receives notification that remote target device 170-1 received the stream of data packets including the audio signal.

In accordance with further embodiments, the base station 140 communicates one or more feedback messages to management server 125 indicating that the stream of data packets was received by the remote target device 170-1. Because one or more feedback messages is received, it may be presumed that the remote target device 170-1 initiated audible playback of the stream of data. By way of non-limiting example, the management server 125 can be configured to notify user 108 that the corresponding audio signal inputted into the microphone of client device 110 was received by remote target device 170-1.

Notification can be implemented in any suitable manner. For example, in one embodiment the management server 125 initiates display of a corresponding message for display on a display screen of client device 110 indicating to user 108 that the audio signal was received and played back by the remote target device 170-1.

Alternatively, feedback from management server 125, base station 140, remote target device etc., can indicate that a corresponding communication session between the client device 110 and the remote target device 170-1 is active, enabling conveyance of control information from client device 110 to remote target device 170-1.

As an alternative to providing a visual notification to user 108 operating client device 110, note that the management server 125 can be configured to generate an audio signal to user 108 indicating that the audio signal inputted into the microphone was properly received and played back at corresponding remote target device 170-1.

In accordance with one specific implementation, during a communication session in which the user speaks into a microphone located at client device 110, the management server 125 receives repeated feedback acknowledgments indicating that a communication link between the client device 110 in the remote target device 170-1 actively conveys the audio signal inputted by the user 108. To provide notification that the communication link is active and healthy, the management server 125 can be configured to initiate playback of a corresponding audible signal to user 108. In one embodiment, the audible signal is a generated feedback signal (such as a beep every few seconds or a continuous background sound) transmitted over network 190-1 to client device 110. A rendition of the audible feedback signal played back at the client device 110 indicates to user 108 that the rendition of the audio signal inputted by user 108 was or is being played back by the selected remote target device. Accordingly, the user 108 can be apprised whether the corresponding communication link is healthy or not.

In accordance with yet further embodiments, user 108 can operate client device 110 to communicate with management server 125 in view a listing of prerecorded content that can be selected for playback on a respective selected remote target device. For example, in response to receiving a request to view a listing of prerecorded content such as songs, the management server 125 produces corresponding webpage information including a listing of available songs, poems, etc., and transmits it to client device 110. Client device 110 initiates display of the listing of prerecorded content to user 108.

In response to the user 108 selecting from the listing of prerecorded content, the client device 110 communicates the corresponding selection as control information to management server 125. In response to receiving a given selection of prerecorded content, the management server 125 retrieves selected content and then initiates transmission of a corresponding audio signal (of the selected prerecorded content) to base station 140. In a manner as previously discussed, the base station 140 transmits the data packets including the selected prerecorded content to the appropriate remote target device. The remote target device initiates playback of the selected prerecorded content in a manner as previously discussed. Accordingly, via the communication system is shown in FIG. 1, a user 108 at a remote location with respect to cemetery 160 is able to initiate playback of corresponding content at a selected remote target device.

Figure 2:
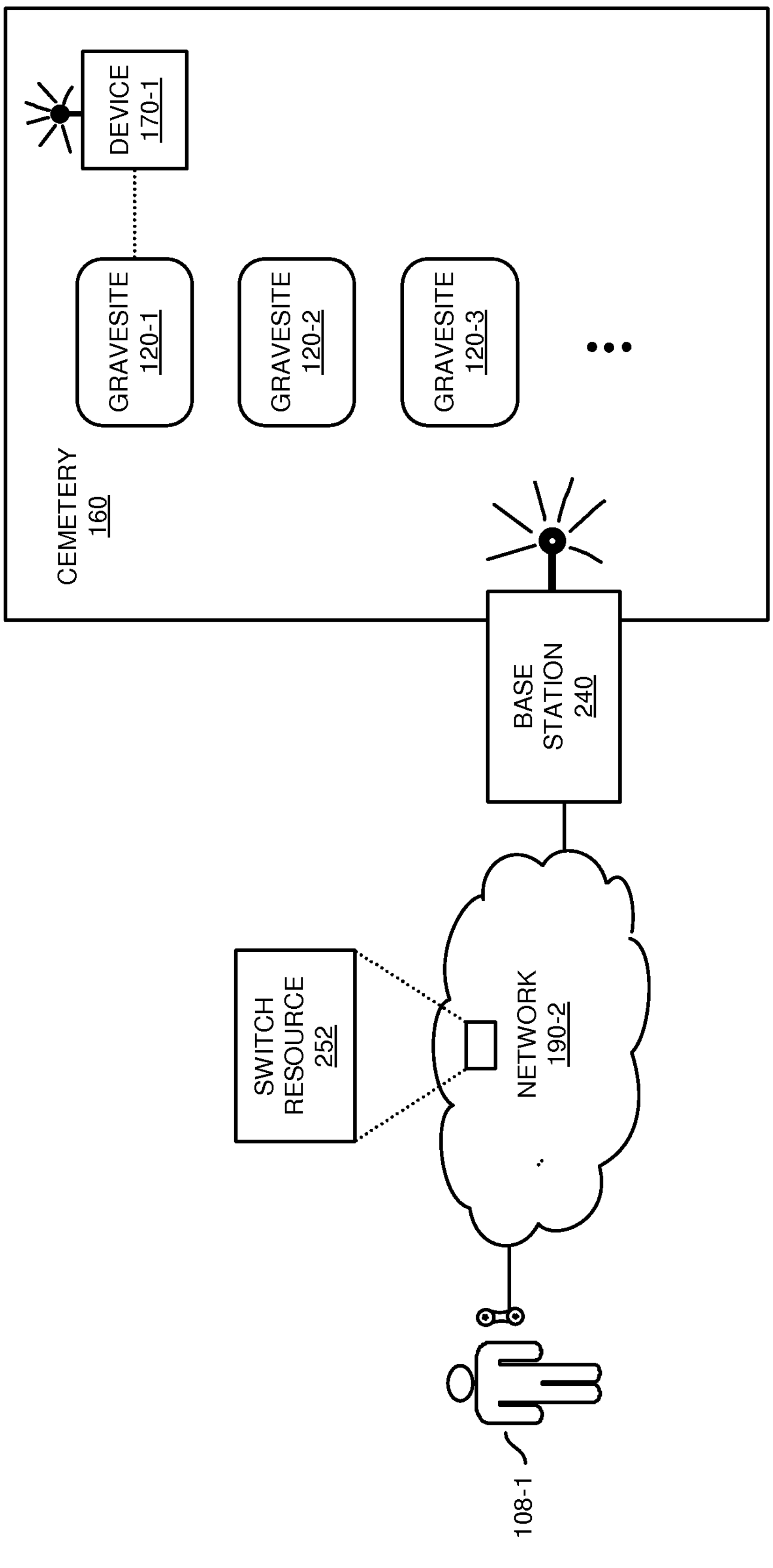
FIG. 2 is an example diagram of a network and corresponding components facilitating communications according to embodiments herein.

FIG. 2 is an example diagram illustrating a network facilitating control of a remote target device according to embodiments herein.

As shown, user 108 operates a respective communication device such as a phone. The user 108 can dial a predetermined phone number or email address assigned to control or communicate with remote target device 170-1. Upon dialing the appropriate telephone number assigned to remote target device 170-1, the base station 240 receives the incoming call. The base station accepts the incoming call to establish a respective phone connection between communication device 210 and the base station 240.

In response to receiving the incoming call, the base station 240 initiates activation of a respective speaker located at remote target device 170-1. While user 108 speaks into communication device 210, the network 190-2 conveys the audio signal to base station 240 via the phone connection. For example, the base station 240 transmits the received audio signal over a wireless link to remote target device 170-1. Remote target device 170-1 in turn plays back the respective audio signal on a speaker. Accordingly, the user 108 is able to communicate audio messages to the deceased party located at the respective target gravesite such as gravesite 120-1 in this instance.

In one embodiment, the network 190-2 includes a switch resource 252 configured to map a corresponding unique phone number to a respective IP address associated with remote target device 170-1. For example, each remote target device can be assigned a unique network address (e.g., IP address, MAC address, etc.). Additionally, a unique phone number such as a ten-digit phone number can be assigned to the remote target device. The map resource in the switch resource 252 maps the phone number assigned to the remote target device 170-1 to a corresponding network address of the remote target device 170-1. Thus, when a user 108-1 makes a call to the unique phone number, the call is routed to switch resource 252. The switch resource maps the incoming call to a corresponding unique network address of the remote target device 170-1. The switch resource 252 then initiates the final leg (e.g., a voice over IP connection) of the call connection via communications with base station 240. Accordingly, upon receiving an incoming call from user 108 operating communication device 210, the switch resource 252 and corresponding communication links enable communications between the user 108 and the remotely located remote target device 170-1.

In certain instances, multiple parties may attempt to connect with a corresponding remote target device at the same time. This may result in a busy signal for one of the calling parties. For example, assume that a first party uses a first phone device to communicate over network 190-2 in order to communicate with corresponding remote target device 170-1. As previously discussed, the communications from the first party control functionality provided by remote target device 170-1. Assume that while the connection is active, that a second party uses a second phone device and attempts to communicate over network 190-2 with the remote target device. In one embodiment, the remote target device 170-1 can be configured to include a storage resource to store an audible communication or corresponding control information from the second party because the first party has an open communication session with the remote target device 170-1. In the case that the storage resource stores an audible communication received from the second party, after the first party as terminated their call connection with the remote target device 170-1, the remote target device 170-1 initiates playback of the recorded audible communication received from the second party. Thus, remote target device 170-1 can be configured to act as an answering machine that automatically plays back prerecorded content after the first party terminates their call. If the second party provided control information instead of an audible signal, the remote target device 170-1 would execute a function as specified by the control information.

In certain instances, it is possible that the remote target device 170-1 is able to simultaneously execute input from both parties. For example, the first party communicating with the remote target device 170-1 may speak into a corresponding microphone so that a rendition of the first party's voice is played back by remote target device 170-1. The second party communicating with the remote target device 170-1 may input control information to turn on a light disposed at remote target device 170-1. In such an instance, there is no need to delay turning on the light in the remote target device 170-1.

In accordance with yet another embodiment, the remote target device can be configured to support a connection with each of multiple circuits/callers. In such an instance, each caller or circuit can have their own private connection so that they can independently talk at the same time (i.e., not in conference call fashion).

If further desired, multiple people can call into a corresponding conference using a conference number. The conversation of multiple parties attending the conference can be processed by a conferencing function in management server 125. The conferencing function in turn forwards an audio signal representative of the conversation to a selected remote target device for corresponding playback.

In accordance with further embodiments, in response to turning on a corresponding light source such as an LED light at the remote target device 170, the remote target device 170 can communicate a corresponding status of the light (e.g., whether the light is on or off) to management server 125. Each of multiple persons in network environment 100 can access a corresponding webpage produced by management server 125 to learn a status of the light disposed at remote target device 170-1. Accordingly, a particular user can indicate to turn on the light at the remote target device 170-1. The management server 125 produces a corresponding webpage indicating the particular user that activated the light. Any of multiple users connecting to management server 125 can retrieve the corresponding webpage information to learn that the light was turned on at a particular time and which particular person controlled the light to an ON state.

Figure 3:
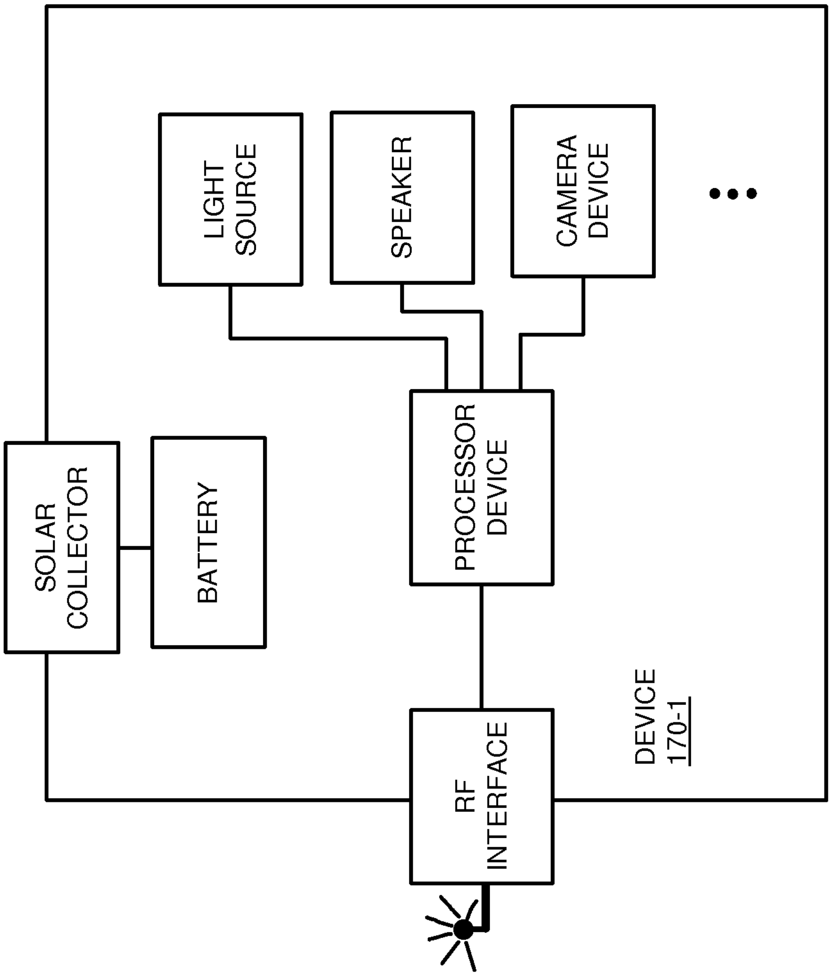
FIG. 3 is an example diagram illustrating a remote target device according to embodiments herein.

FIG. 3 is an example diagram illustrating an example remote target device according to embodiments herein.

As shown, a respective remote target device 170-1 can include a device to receive solar power and store such power in a battery. The battery powers remote target device 170-1.

Alternatively, each of the remote target devices 170 can also be configured in a form that does not require daylight to power the unit but rather can be plugged into a standard outlet for its power.

As previously discussed, the remote target device 170-1 can include an RF interface to communicate with a respective base station (e.g., base station 140, base station 240). A processor device disposed in the remote target device 170-1 decodes received messages and controls one or more functions associated with the remote target device 170-1. For example, the message such as control input received from a respective user 108 can indicate to playback an audio message using a speaker; the message received from a respective user 108 can indicate to control a respective light source; the message received from a respective user 108 can indicate to control a respective video camera; etc. The processor device executes the control function as specified by the respective communication. Accordingly, the user 108 at a remote location can control one or more functions supported by the remote target device.

In a reverse direction, note that the remote target device 170-1 can initiate communications to base station 140, 240. The base station forwards the communications to management server 125 that makes the information available to user 108 at client device 110.

Note again that techniques herein are well suited for use in burial sites environments. However, it should be noted that embodiments herein are not limited to use in such applications and that the techniques discussed herein are well suited for other applications as well.

Additional Embodiments

As previously discussed, a resource such as management server 125 can be configured to provide connectivity between users operating corresponding computer devices such as cell phones, personal computers, landline phones, etc., to a corresponding remote target device.

In one embodiment, the management server 125 keeps track of the actions associated with different users and records them in a log. For example, the management server 125 can be configured to store log information such as: i) information indicating the unique identity such as a telephone number, name of a person, etc., of the a user controlling a respective remote target device, ii) the type of function (call, playback of a prayer, controlling a light source, etc.) executed by the user, iii) the time at which the person controlled the remote target device, iv) a time when a corresponding prerecorded message such as a prayer was played back, and so on.

Assume in this example that a first user operating a first respective computer device communicates with remote target device 170-2 in order to playback a corresponding prayer at gravesite 120-1. In such an instance, the management server 125 stores information such as the unique identity of the person or phone, the function initiated by the first user such as the prayer, when the first user initiated playback of prayer, etc.

The corresponding log produced by the management server 125 can be accessible to different users. For example, a user of the system as described herein can perform a search for a particular party of interest. In response to receiving a command from the user to view a log associated with a selected party of interest resulting from the search, the management server 125 generates corresponding webpage information including the log as discussed above. Based on viewing the log, the user can determine the different activities that have taken place with respect to a corresponding remote target device associated with the selected party of interest.

In addition to maintaining log information, the management server 125 can be configured to keep track of messages posted by multiple users. For example, as discussed above, a user can search for and select a particular party of interest. After finding a particular party of interest, the user can initiate a command to the management server 125 to display a corresponding message board associated with a particular party of interest. Users can post messages to the message board. Via the message board, the different users can view each other's postings.

In yet further embodiments, a party of interest may be cremated, remains of which are placed in a container such as an urn. The system as discussed herein can be configured to allow a voice visit even though a person's remains are disposed in an urn. The urn may be located inside a room or enclosure that has low light. In other words, the room may be void of sunlight. In such an instance, the remote target device cannot be powered by optical energy.

Embodiments herein can include multiple types of remote target devices such as a remote target device of type A and a remote target device of type B, the different types of remote target devices can be tailored to operate in different environments.

In this example embodiment, the remote target device of type "A" can be mounted outdoors on a suitable resource such as a gravestone. In this instance, the remote target device of type A receives optical energy that is converted via a photocell into electricity stored in a battery. The remote target device of a type A can include the same circuitry as discussed above (to perform operations such as playback of audio, generation of a light signal, and so on), however, in place of the speaker, the remote target device of type A can include a radio transmitter. The radio transmitter can be tuned to several different frequencies.

The remote target device of type B can include one or more passive RFID (Radio Frequency) tags. A passive ID tag works by having a radio signal (from a source such as a remote target device of type A) excite the internal antenna of the RFID tag. In one non-limiting example embodiment, in response to receiving for detecting the excitation energy produced by the remote target device of type A, the RFID tag in the remote target device of type B produces a small amount of electric current. The electric current is enough to power a small transmitter in the tag.

Embodiments herein include modifying an RFID tag such that presence of the excitation energy causes the RFID tag in the remote target device of type B to power a small radio receiver and be tuned to a channel on which the remote target device of type A transmits a corresponding signal to the remote target device of type B. In one embodiment, the remote target device of type A transmits a corresponding voice signal over the channel to the remote target device of type B.

In one embodiment, a respective remote transmitter device of remote target device of type A can be configured as a repeater that receives a corresponding signal and transmits a signal onto another remote target device.

Depending upon the size of the antenna and the frequency of the initial radio transmission from the remote target device of type B, the remote target device of a type B can be 25 feet or more away from the remote target device of type A. Voice will come out of device B which can be attached to a particular urn. Communications can be encrypted and decrypted back into audio to prevent eavesdroppers from listening to open radio transmissions.

In one embodiment, the remote target device of type A produces, via outputted radio waves, a powerful magnetic field—which hits a dipole antenna which causes an electric current to flow back and forth in the antenna generating a standing wave which is rectified and amplified using a circuit called Dickson Charge Pump—this charges the RFID tags power storage which produces direct power voltage to power internal circuitry of remote target device of type B. In one embodiment, the internal circuitry is a radio receiver that is tuned to the same frequency being broadcast by remote target device of type A that carries the audio portion of the call.

Note that embodiments herein can further include providing video data for playback on a respective remote target device. As an example, each of remote target devices 170 can include a corresponding display screen, each of which enables playback of video. In a manner as discussed above for audio content, the management server 125 can be configured to receive selected video content (a respective user of a client device can provide the video or the user can select amongst prerecorded video content video content managed by the management server 125). At a time as specified by the user 108, the remote target device 170-1 initiates playback of corresponding selected video.

While the different inventions have been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims

What is claimed is:

1. A system comprising:

a first communication device, the first communication device disposed at and affixed to a site at which a deceased party resides, the first communication device comprising:

a communication interface to receive a communication signal transmitted from a user operating a second communication device at a remote location;

a resource to produce a perceptible output; and a processor device to process the communication signal received from the second communication device and control the resource to produce and direct the perceptible output to the deceased party;

wherein the perceptible output is an audio communication originated by the user operating the second communication device; and wherein the user operating the second communication device is knowledgeable that the deceased party resides at the site and that the audio communication is outputted to the deceased party;

wherein the second communication device is a phone device, the user inputting a unique identifier assigned to the first communication device into the second communication device to establish a call connection between the second communication device and the first communication device; and wherein the first communication device automatically accepts an incoming call from the second communication device on behalf of the deceased party to establish the call connection on which to convey the communication signal.

2. The system as in claim 1, wherein the site is a gravesite, the perceptible output being a communication outputted from the resource and directed to the deceased party.

3. The system as in claim 2, wherein the user operating the second communication device is knowledgeable that the disabled party is in the state of unconsciousness and lacks an ability to respond to the perceptible output; and wherein the perceptible output is sound initiated by the user operating the second communication device, the sound showing support to the disabled party.

4. The system as in claim 1, wherein the first communication device provides feedback to the second communication device subsequent to executing a command as specified by the communication signal, the feedback indicating that the command was executed by the first communication device.

5. The system as in claim 1, wherein the first communication device provides an acknowledgment to the second communication device to indicate an active communication session between the second communication device and the first communication device, the active communication session supporting conveyance of control information from the second communication device to the first communication device.

6. The system as in claim 5, wherein the acknowledgment causes the second communication device to initiate playback of an audible signal to the user, the audible signal indicating that the first communication device is connected with the second communication device via the communication session.

7. The system as in claim 1, wherein the resource is a speaker.

8. The system as in claim 1, wherein the communication signal is a prerecorded audio signal selected by the user of the second communication device for playback on the resource of the first communication device.

9. The system as in claim 1, wherein the perceptible output is playback of a rendition of the audio signal at the site.

10. The system as in claim 1, wherein the user is a first party;

wherein the communication signal is a first communication signal;

wherein the communication interface supports an active communication session between the first communication device and the second communication device, the user of the second communication device generating the first communication signal to control the first communication device while the communication session is active;

wherein the first communication device, during the active communication session, receives a second communication signal from a second party and stores the second communication signal; and wherein the first communication device produces the perceptible output in accordance with the second communication signal subsequent to termination of the active communication session.

11. The system as in claim 1, wherein the communication signal is a first communication signal;

wherein the user is a first party;

wherein the first communication device receives a second communication signal, the second communication signal initiated by a second party at a remote location with respect to the first communication device; and wherein the processor device simultaneously controls the perceptible output of the first communication device in accordance with the first communication signal and the second communication signal.

12. The system as in claim 1, wherein the communication signal is an audio conference signal in which multiple parties including the user communicate with each other at a remote location with respect to the site; and wherein the first communication device initiates playback of a rendition of the audio conference signal from the resource.

13. The system as in claim 1, wherein the first communication device:

processes the communication signal to identify a specified time at which to produce the perceptible output;

schedules generation of the perceptible output at the specified time; and controls the first communication device to produce the perceptible output at the specified time.

14. The system as in claim 1, wherein the communication signal includes control information to control a camera disposed in the first communication device; and wherein the second communication device controls the camera in a manner as specified by the control information in the communication signal received from the second communication device.

15. The system as in claim 14, wherein the resource is a display screen; and wherein the perceptible output is a rendition of video displayed on a display screen of the first communication device, the second communication device transmitting the video to the first communication device.

16. The system as in claim 1 further comprising:

an RF transmitter, the RF transmitter transmitting the communication signal to a third communication device.

17. A method comprising:

receiving a communication signal at a first communication device, transmission of the communication signal initiated by a user operating a second communication device at a remote location with respect to the first communication device, the first communication device disposed at a site in which a called party resides, the user attempting to communicate with the first communication device;

processing the communication signal; and controlling the first communication device to produce a perceptible output at the site, the perceptible output directed to the called party and produced in a manner as indicated by the communication signal received from the second communication device, the called party at the site being deceased and incapable of responding to the perceptible output, the first communication device affixed to the site at which the deceased party resides;

wherein the user is a first party;

wherein the communication signal is a first communication signal, the method further comprising:

establishing an active communication session between the first communication device and the second communication device, the user of the second communication device generating the first communication signal to control the first communication device while the communication session is active;

during the active communication session: i) receiving a second communication signal, the second communication signal received from a second party attempting to communicate with the first communication device, and ii) storing the second communication signal in a repository; and subsequent to termination of the active communication session, controlling the perceptible output of the first communication device in accordance with the second communication signal.

18. The method as in claim 17, wherein the site is a gravesite in which the deceased party resides.

19. The method as in claim 17 further comprising:

subsequent to executing a command as specified by the communication signal, providing feedback from the first communication device to the second communication device, the feedback indicating that the command was executed by the first communication device.

20. The method as in claim 17 further comprising:

providing an acknowledgment from the first communication device to the second communication device to indicate an active communication session between the first communication device and the second communication device, the active communication session enabling conveyance of control information from the second communication device to the first communication device.

21. The method as in claim 20, wherein the acknowledgment causes the second communication device to initiate playback of an audible signal to the user indicating that the first communication device is connected with the second communication device.

22. The method as in claim 17, wherein controlling the first communication device to produce the perceptible output includes: initiating playback of a video signal on a display screen of the first communication device.

23. The method as in claim 17 further comprising:

receiving the communication signal from a server resource, the communication signal being a prerecorded audio signal selected by the user of the second communication device for playback on the first communication device.

24. The method as in claim 17 further comprising:

receiving the communication signal as an audio signal generated by the user speaking into the second communication device; and wherein controlling the first communication device to produce the perceptible output includes initiating playback of a rendition of the audio signal at the first communication device, the first communication device outputting the rendition of the audio signal from the resource to the deceased party at the site.

25. The method as in claim 17, wherein the communication signal is a first communication signal;

wherein the user is a first party, the method further comprising:

receiving a second communication signal at the first communication device, transmission of the second communication signal initiated by a second party at a remote location with respect to the first communication device; and simultaneously controlling the first communication device to produce the perceptible output of the first communication device in accordance with the first communication signal and the second communication signal.

26. The method as in claim 17 further comprising:

receiving the communication signal as an audio conference signal in which multiple parties including the user communicate with each other; and initiating playback of a rendition of the audio conference signal at the first communication device.

27. The method as in claim 17, wherein processing the communication signal includes:

processing the communication signal to identify a specified time at which to produce the perceptible output;

scheduling generation of the perceptible output at the specified time; and controlling the first communication device to produce the perceptible output at the specified time.

28. The method as in claim 27, wherein producing the perceptible output at the specified time includes: initiating playback of an audible signal from a speaker disposed in the first communication device.

29. The method as in claim 27, wherein producing the perceptible output at the specified time includes: initiating lighting of a light source disposed in the first communication device.

30. The method as in claim 17, wherein the communication signal includes control information to control a camera disposed in the first communication device; and controlling the camera in the first communication device in a manner as specified by the control information in the communication signal.

* * * * *